Figure 3:
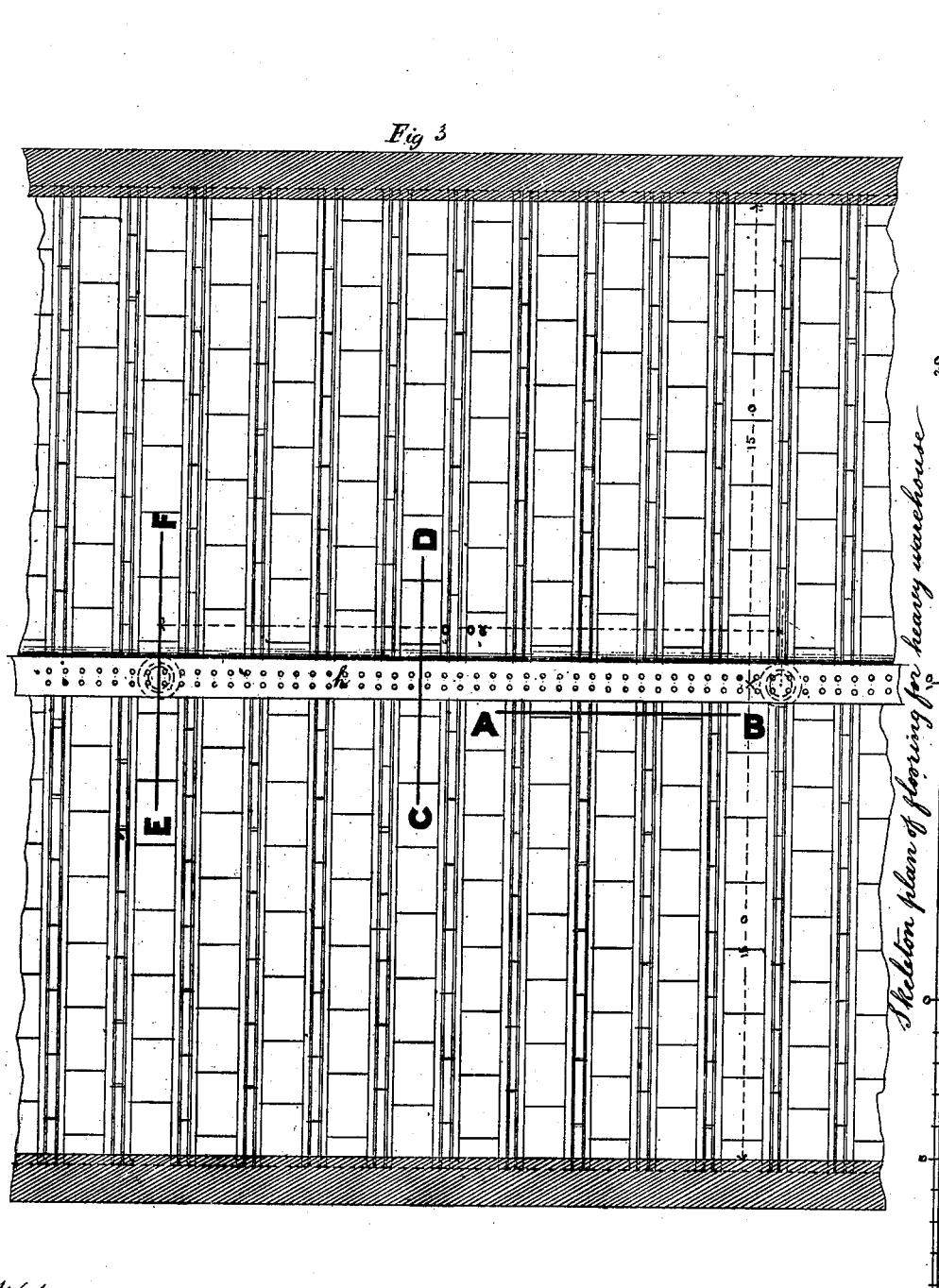

7 Sheets—Sheet 1.
L. HORNBLOWER.
FIRE-PROOF CONSTRUCTION.
No. 178,852. Patented June 20, 1876.
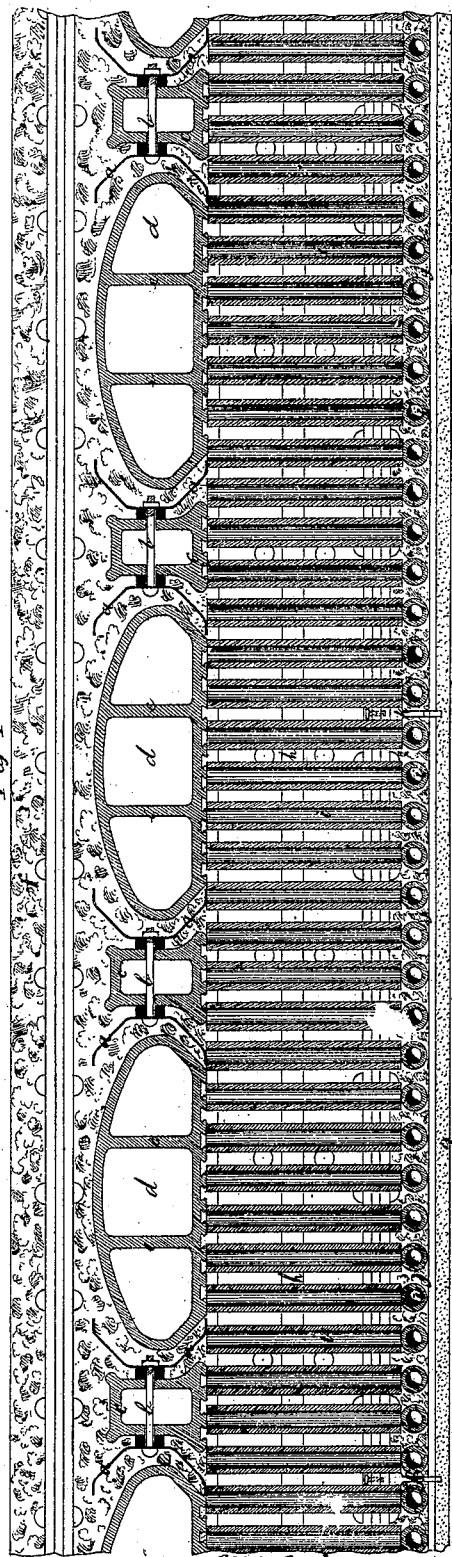
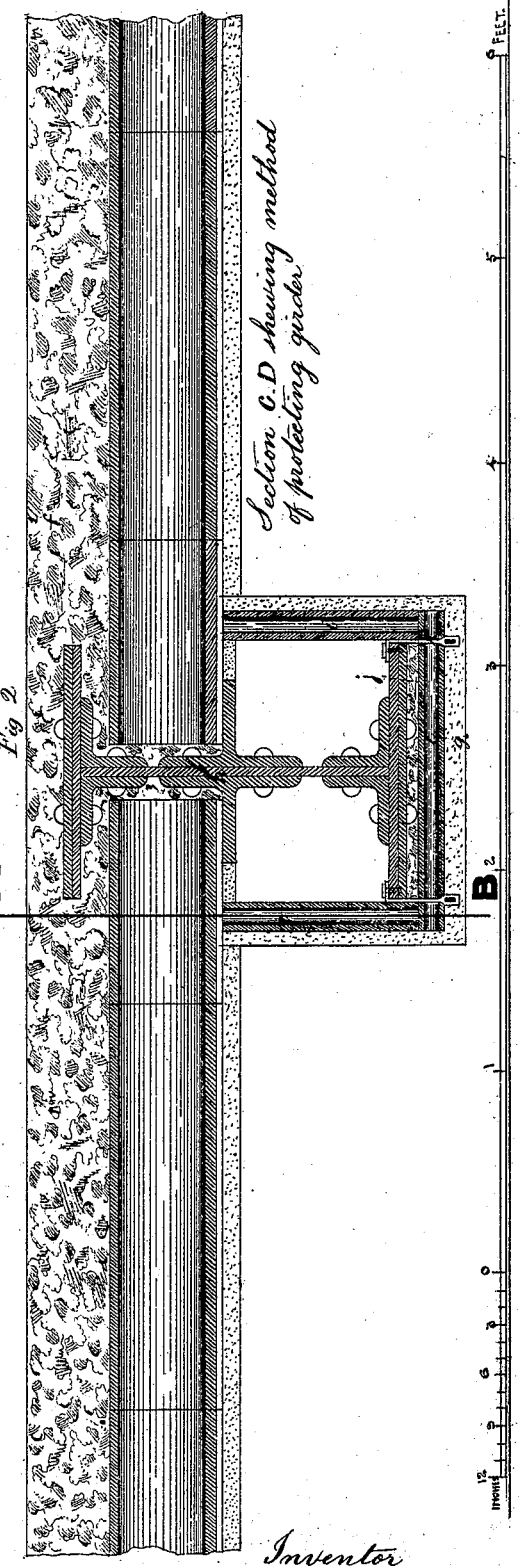

L. HORNBLOWER.
FIRE-PROOF CONSTRUCTION.

No. 178,852.                    Patented June 20, 1876.

Witnesses
Inventor

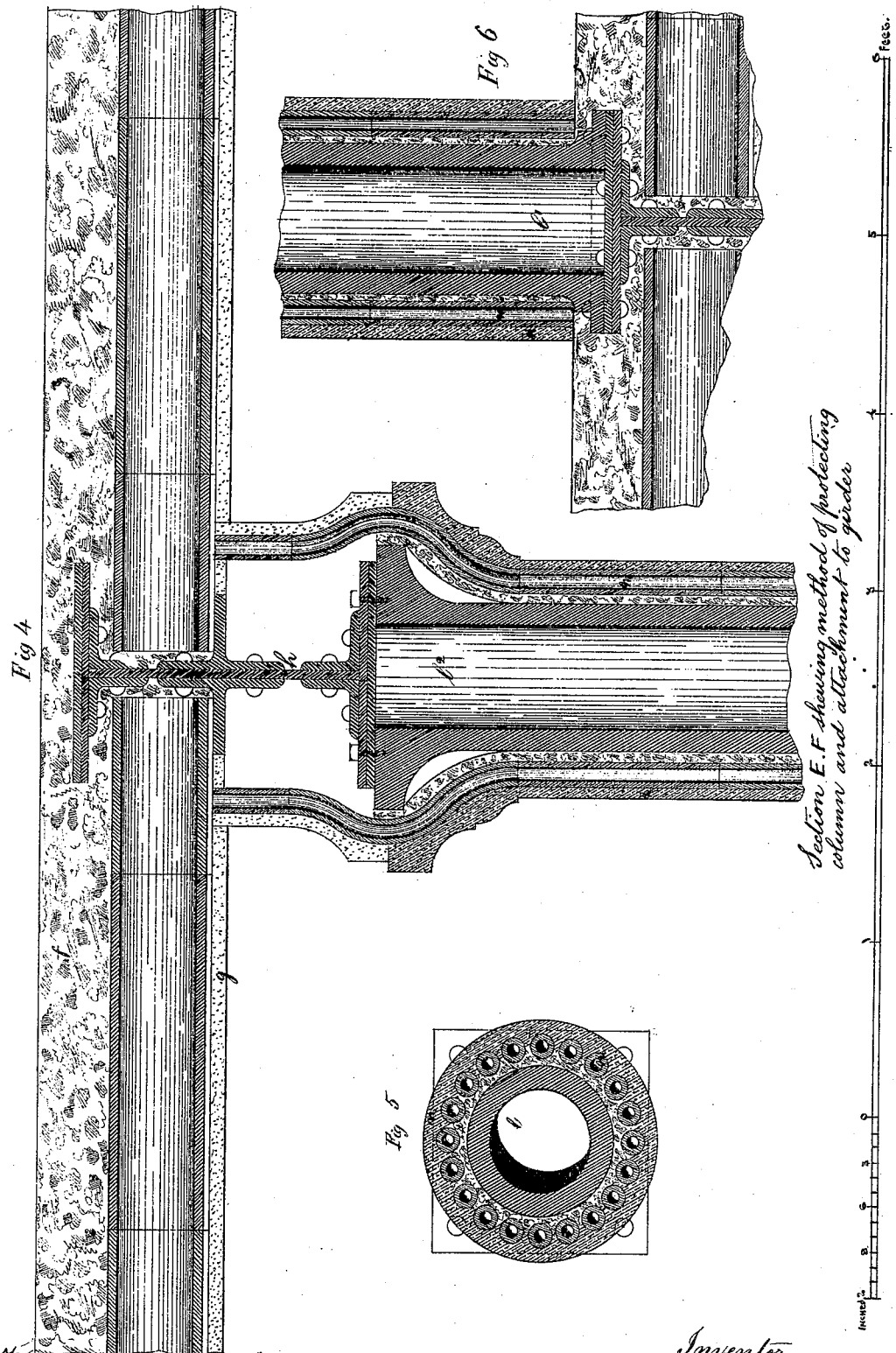

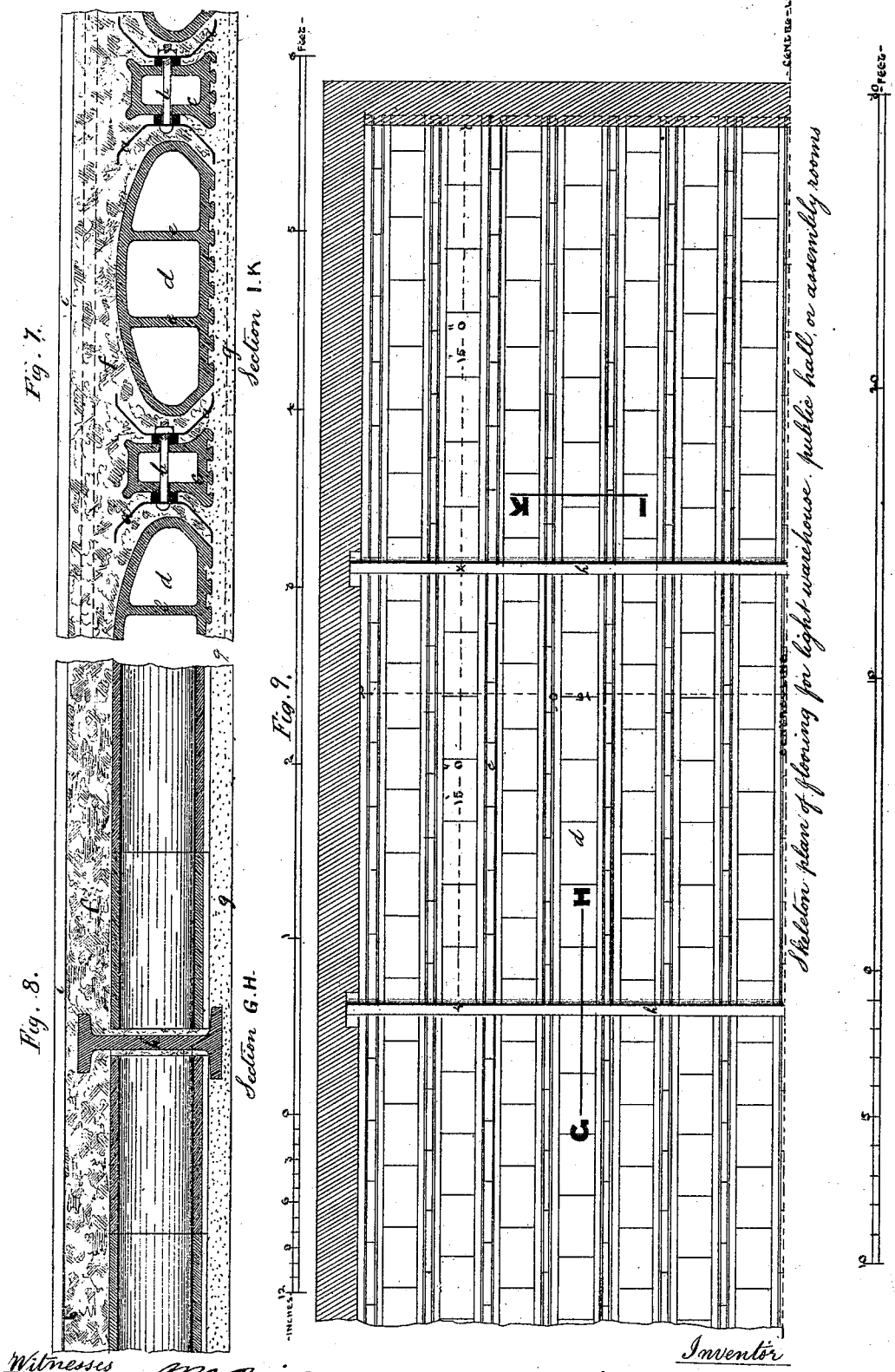

L. HORNBLOWER.
FIRE-PROOF CONSTRUCTION.
No. 178,852. Patented June 20, 1876.
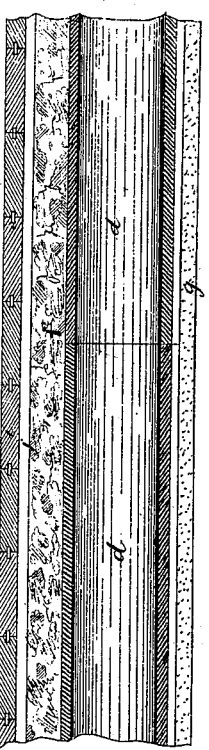
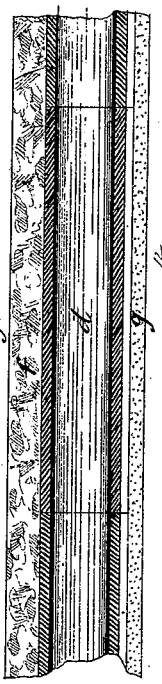
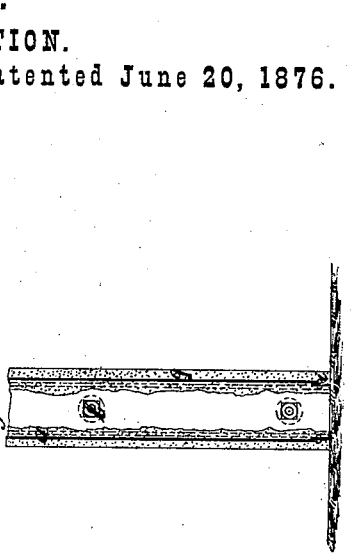
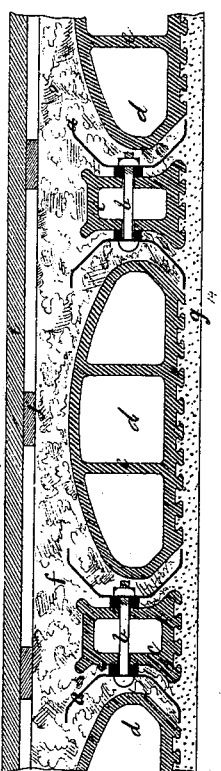
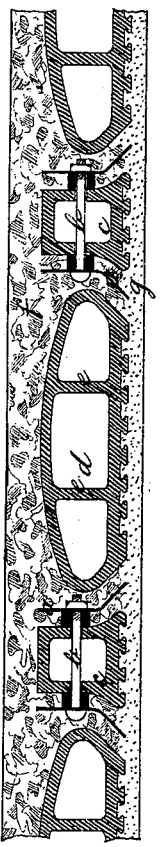
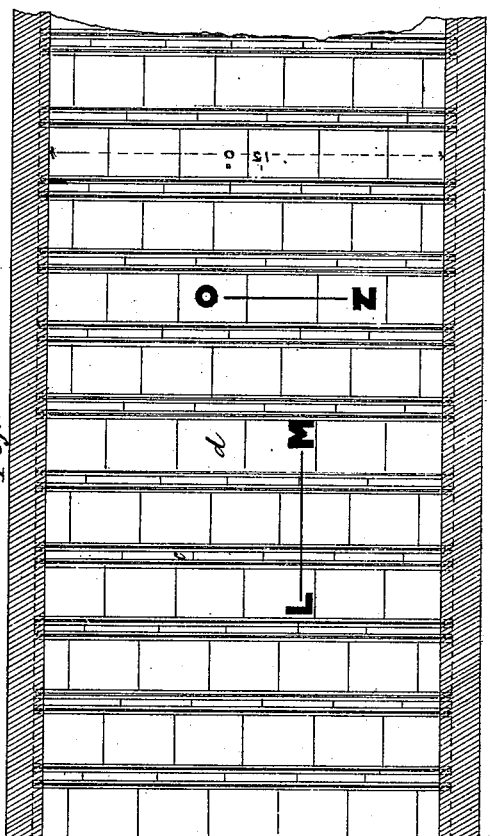
Witnesses Inventor

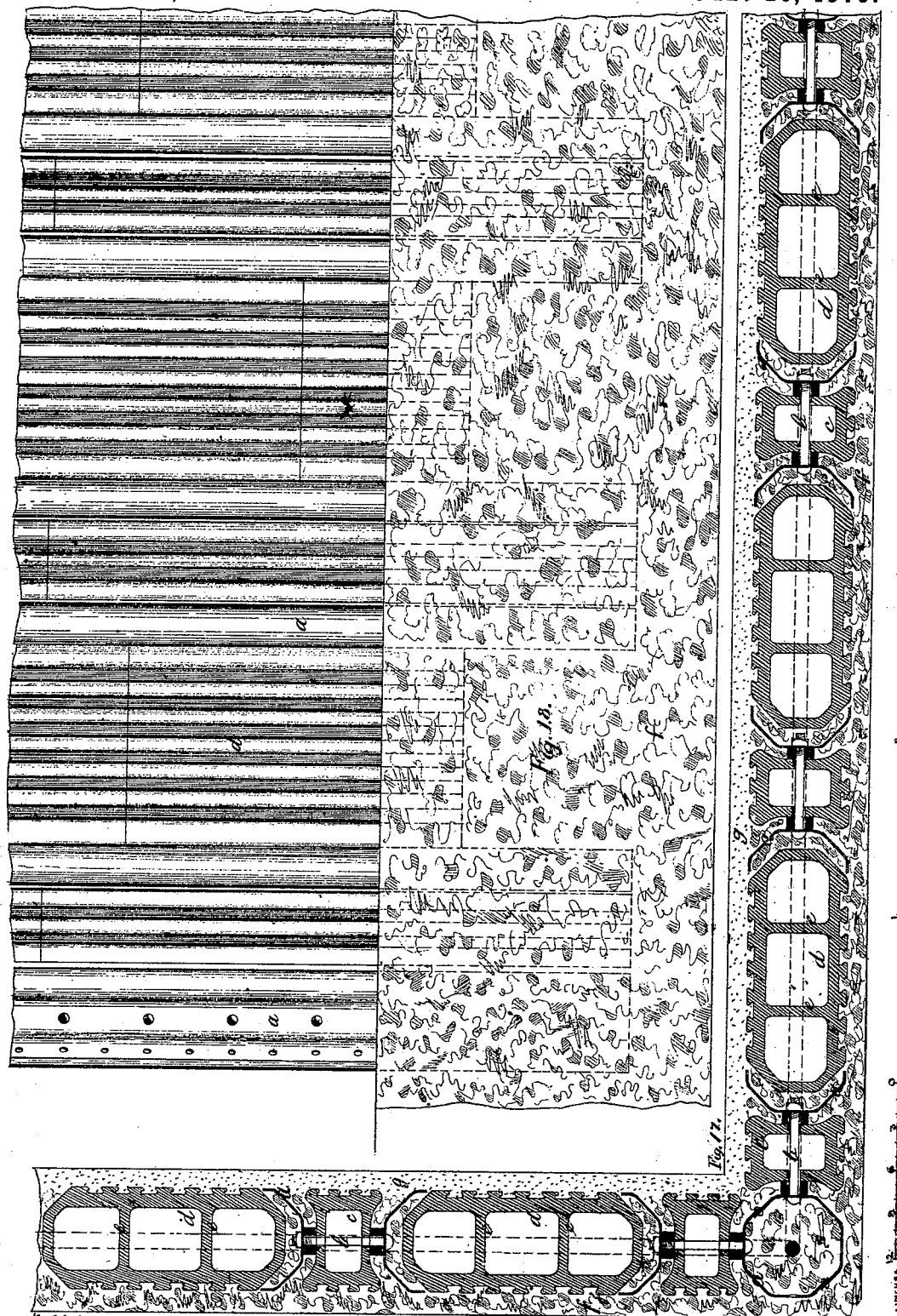

7 Sheets—Sheet 7.
L. HORNBLOWER.
FIRE-PROOF CONSTRUCTION.
No. 178,852. Patented June 20, 1876.
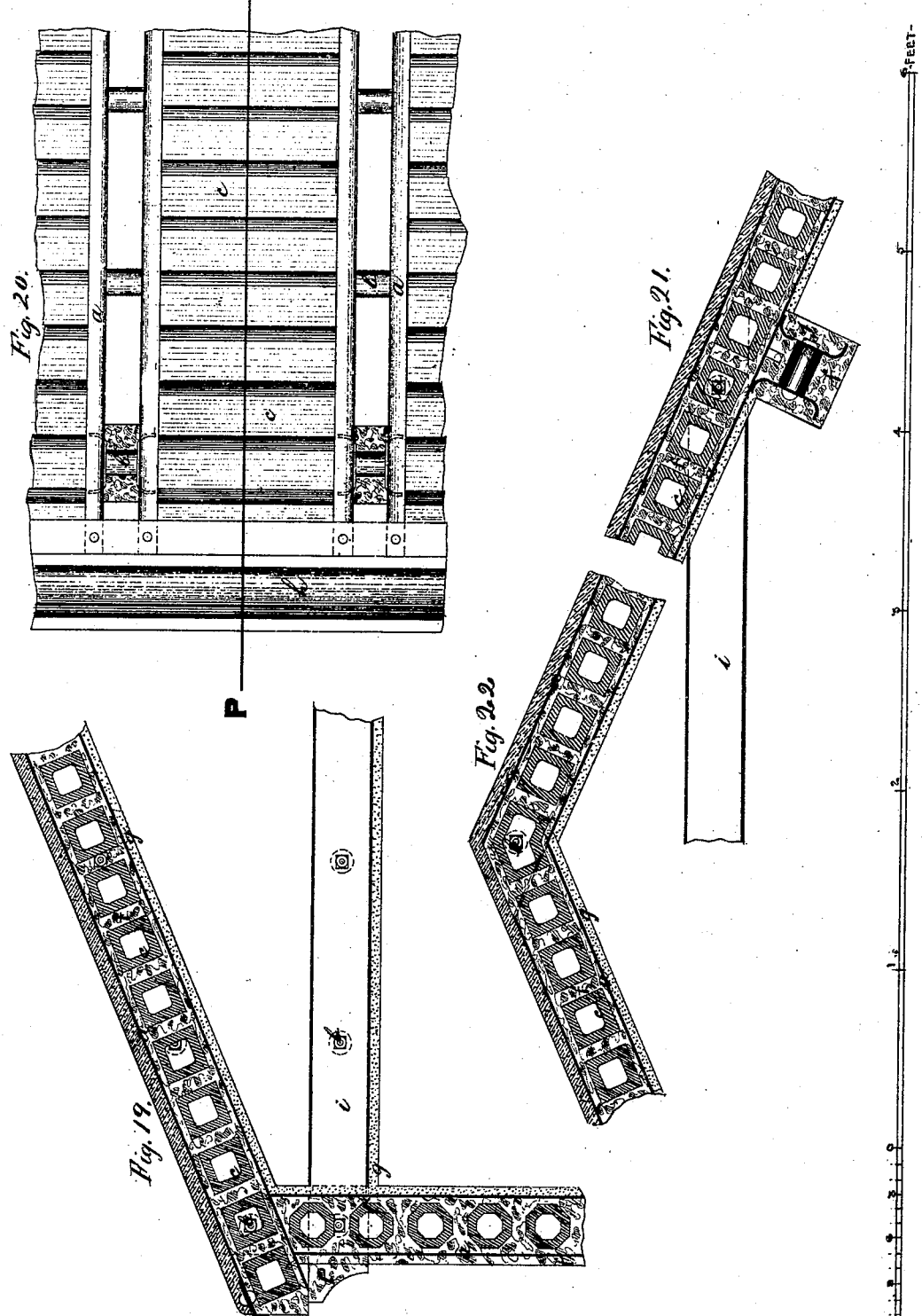

UNITED STATES PATENT OFFICE.

LEWIS HORNBLOWER, OF LIVERPOOL, ENGLAND.

IMPROVEMENT IN FIRE-PROOF CONSTRUCTION.

Specification forming part of Letters Patent No. 178,852, dated June 20, 1876; application filed December 10, 1873.

*To all whom it may concern:*

Be it known that I, LEWIS HORNBLOWER, of the city of Liverpool, county of Lancaster, England, have invented Improvements in the Construction of Fire-Proof Buildings, of which the following is a specification:

The object of my invention is to provide walls, partitions, floors, and roofs of buildings, at once light, cheap, durable, thoroughly fire-proof, and convenient for ventilating the rooms or spaces they inclose.

For these purposes I employ, in combination, for walls, partitions, floors, and roofs, iron or steel, hollow earthenware, and concrete or cement. Walls, partitions, floors, and roofs are constructed of sheet iron or steel, preferably so formed as to represent one-half of a honey-comb cell cut longitudinally. These lengths of iron or steel are placed parallel or close to oval pipes or other hollow earthenware, and the whole are bound into a comparatively rigid mass by concrete or cement. The concrete or cement may be filled into the trough-like side of each length of iron or steel before it is placed in position.

In walls and partitions the iron or steel lengths are placed in a vertical, in floors in a horizontal, and in roofs in an angular, position. Where great strength is required two of the said iron or steel lengths are placed back to back and bolted together, so as to form a girder, hollow earthenware, with apertures therein for the bolts, being interposed.

It will be obvious that bricks, flooring-boards, or other desired surfaces may be attached to parts constructed in accordance with my invention.

Figure 1 is a transverse section; Fig. 2, a longitudinal section; Fig. 3, a skeleton plan; Fig. 4, another longitudinal section, showing supporting-column; Fig. 5, horizontal section of column, and Fig. 6 a vertical section through base of supporting-column, all of a floor constructed and supported in accordance with my invention, the same having thirty-feet bearings between walls, columns twenty feet from center to center, and being suitable for warehouses, malt-houses, breweries, factories, and other large buildings in which heavy weights have to be carried.

Like letters denote the same parts in all these views.

$a$ are sheet-metal joists or flitches, placed back to back, and secured together by bolts and nuts $b$; $c$, hollow fire-clay or earthenware cores, through which the bolts $b$ are passed, and forming, with a composite girder, $d$, hollow fire-clay or earthenware tubes. (Here shown with arched tops and vertical strengthening-webs $e$.)

The tubes $d$ are here placed end to end. If preferred, they can be formed with sockets. When placed in position, as shown in Fig. 3, concrete (marked $f$) is filled in from the top, a temporary plank or frame being used to prevent it from extending beyond the ceiling-level.

Plaster, marked $g$, is afterward added in any ordinary manner, the surfaces of the parts forming the skeleton frame being roughened, ground, or perforated in such manner that the concrete and plaster, or either of them, are or is well keyed. $h$, supporting metal girder, protected by the horizontal and vertical earthenware tubes $i$, embedded in concrete $j$, the said horizontal protecting-tubes being suspended from the lower flange of the girder by metal carrying pieces and rods $k$, and the vertical tubes supported over them; $l$, metal column carrying girder $h$. The base of the column is marked $l^1$ and the capital $l^2$. $m$ are protecting fire-clay or earthenware pipes, placed around $l$, and embedded in concrete $n$.

If desired, openings can be left in the ceilings or floors in communication with the spaces in the earthenware tubes employed in the floor, and in like manner the tubes surrounding the columns can be formed with apertures, either of the said tubes being in communication with a vertical discharge-shaft in the walls or elsewhere. Efficient ventilation of the rooms or inclosed spaces is thereby insured.

When necessary hot or cold air can be forced or drawn through the before-described earthenware tubes, and admitted to rooms or spaces at pleasure.

Fig. 7 is a transverse section, Fig. 8 a longitudinal section, and Fig. 9 a skeleton-plan, all of flooring suitable for light warehouses, assembly-rooms, and public halls, rolled transverse girders being used every fifteen feet.

Like letters indicate the same parts in these views.

*a*, metal joists; *b*, bolts; *c*, earthenware cores; *d*, earthenware tubes, with vertical strengthening-webs *e*; *f*, concrete; *g*, plaster; *h*, rolled-metal girder; *i*, tiles.

Fig. 10 is a transverse section, and Fig. 11 a longitudinal section, of a floor suitable for dwelling-houses, offices, and places where from sixteen to eighteen feet bearings are used without transverse girders. Here *a* are the metal joists; *b*, tie-bolts; *c*, earthenware cores; *d*, earthenware tubes with webs *e*; *f*, concrete; *g*, plaster; *i*, flooring-boards resting on fillets *j*.

Fig. 12 is a horizontal section, and Fig. 13 a vertical section, of a light fire-proof partition, more especially adapted for dwelling-houses. *a*, metal uprights; *b*, tie-bolts; *c'*, metal wires, secured by clips to uprights *a*. Woven-wire fencing answers well. *f*, concrete between the uprights; *g*, plaster over the wire *c'*, the meshes of the wires serving as a key for the plaster; *i*, metal tie-band, for foot and head of partition.

Fig. 14 is a transverse section, Fig. 15 a longitudinal section, and Fig. 16 a skeleton plan, all of a light flat roof or floor under my invention, the same being suitable up to twelve-feet bearings without transverse girders. *a*, metal joists, formed of angular metal pieces, bolted together by bolts and nuts; *c*, earthenware cores; *d*, earthenware tubes with webs *e*; *f*, concrete; *g*, plaster. In this modification the sheet-metal joists are bent outward toward their bases, and so serve more effectually to retain the concrete during construction, while they form skewbacks for the sides of the arched tubes *d*.

Fig. 17 is a horizontal section, and Fig. 18 a skeleton elevation, of walls constructed in accordance with my invention. These walls are suitable for dwelling-houses, more particularly in warm climates. Here, *a* are metal uprights; *b*, tie-bolts; *c*, earthenware cores; *d*, earthenware vertical tubes, roughened on both sides, and formed with transverse webs *e*; *f*, concrete; *g*, plaster. The metal upright forming the angle-tie must be formed with apertures or keying spaces to hold the concrete. In practice I prefer to fill the said angle-piece with concrete. The metal uprights are shown deeply embedded in a footing of concrete. The earthenware cores and tubes are also embedded, but not so deeply, in the said footing.

After erecting the metal uprights and earthenware cores and tubes, the concrete and plaster can be laid on by hand, and hence the use of heavy frame-work is dispensed with. Doors and windows are formed by omitting portions of the uprights, and leaving spaces to receive the frames, which latter are properly bedded in concrete.

Fig. 19 is a vertical section, showing the junction of wall and roof at the eaves; Fig. 20, a skeleton plan; Fig. 21, a vertical section, showing method of securing purlin to rafter; and Fig. 22 a vertical section at ridge, all of a modification of a sloping fire-proof roof suitable for buildings generally, and more particularly for railway and other sheds. Like letters here indicate equivalent parts in both the roof and wall. *a*, metal flitches. The form is best seen in Fig. 20. *b*, tie bolts; *c*, earthenware tubes, extending transversely from *a* to *a*; *f*, concrete; *g*, plaster; *h*, gutter, secured to *a*; *i*, ceiling joists, constructed as shown in Figs. 12 and 13, the wire-work being attached to the under side, so as to receive the plaster. The purlin *j* is constructed of metal and concrete.

What I do claim is—

1. A composite girder, made up of iron or steel joists and fire-clay or earthenware cores, rigidly connected together, and combined substantially as and for the purposes set forth.

2. In combination with the rigidly-connected joists *a* and cores *c*, the interposed tubes *d* and concrete filling, substantially as set forth.

3. The combination of girder *h*, earthenware tubes *i*, concrete *j*, and carriers *k*, substantially as set forth.

4. The combination of column *l*, surrounding earthenware tubes *m* and concrete *n*, substantially as set forth.

5. The U-shaped pieces *a*, connected back to back by bolts *b*, in combination with wire-work *c*, secured to the flanges of the pieces *a*, substantially as set forth.

6. The U-shaped pieces *a*, connected back to back by bolts *b*, in combination with hollow tubes *c*, interposed between the pieces *a* and concrete filling, substantially as set forth, with reference to Figs. 26—29.

LEWIS HORNBLOWER.

Witnesses:
M. E. BIRKETT,
JAS. JOHNSON.